Sept. 16, 1947.  A. E. KIMBERLY, JR  2,427,408
POWER TRANSMISSION CONTROL MEANS
Filed Oct. 4, 1940  4 Sheets-Sheet 1
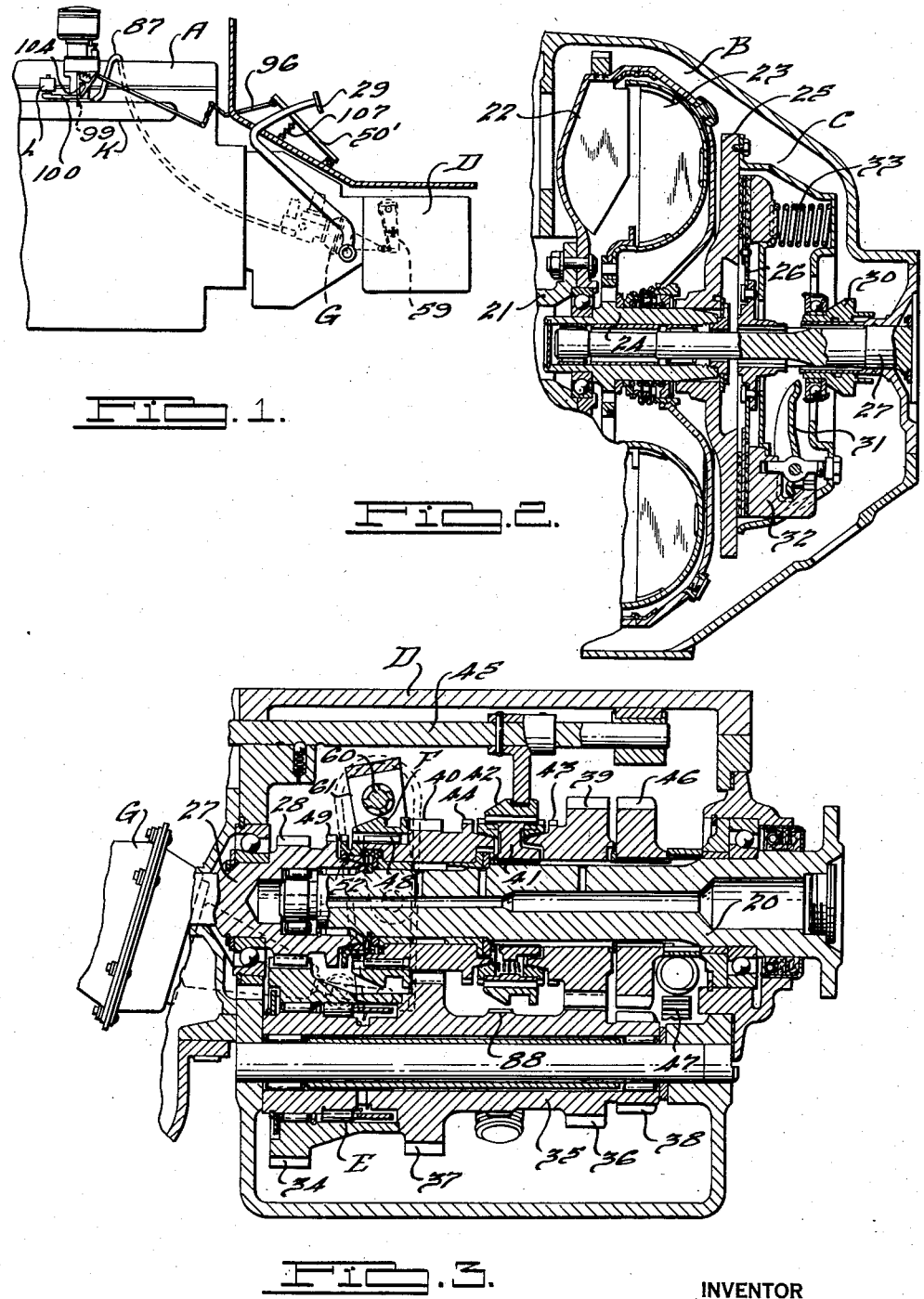
INVENTOR
*Albert E. Kimberly, Jr.*
BY
*Harness, Dickey, Pierce & Harris*
ATTORNEYS

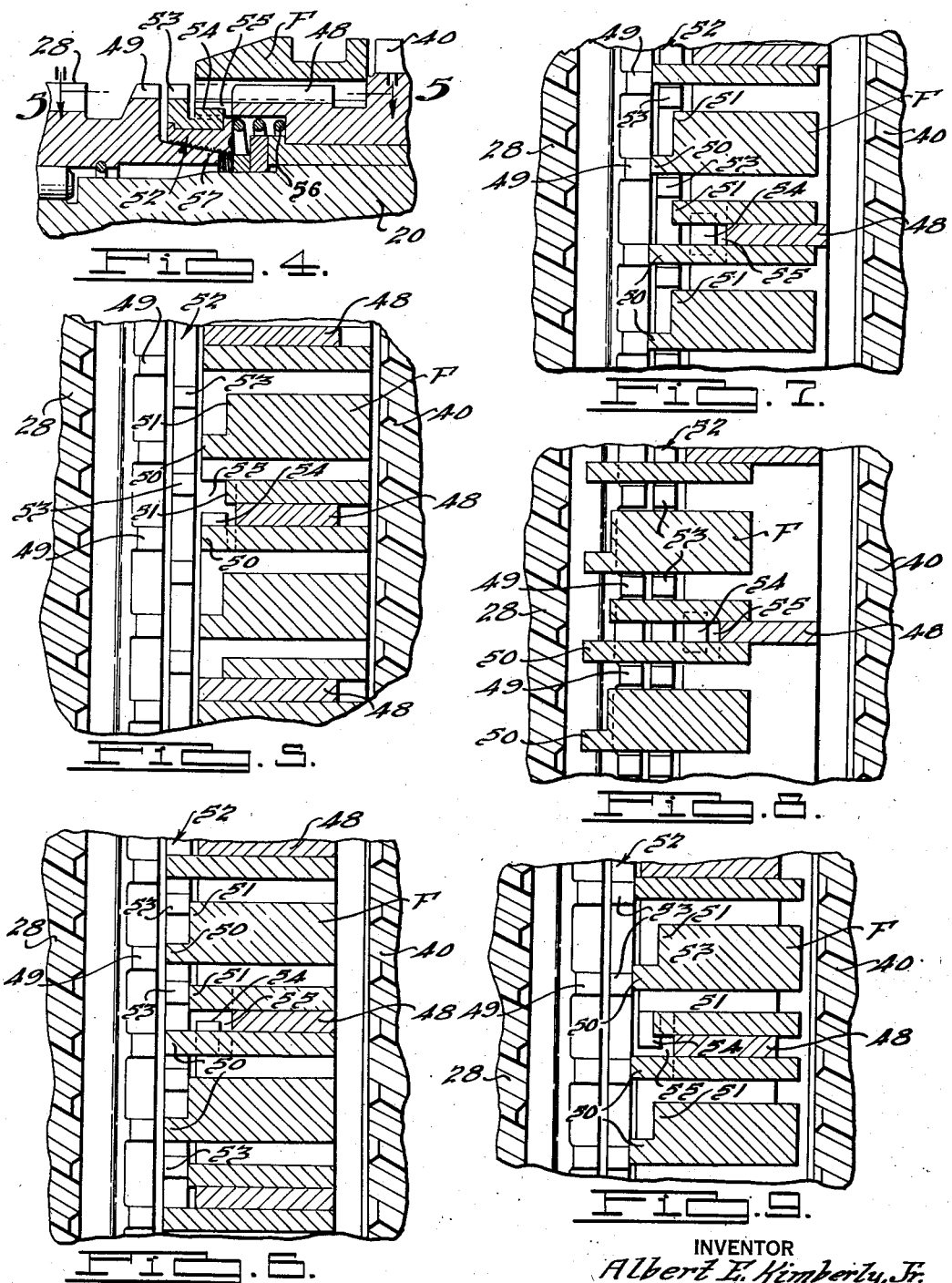

Sept. 16, 1947.　　A. E. KIMBERLY, JR　　　2,427,408
POWER TRANSMISSION CONTROL MEANS
Filed Oct. 4, 1940　　　4 Sheets-Sheet 3
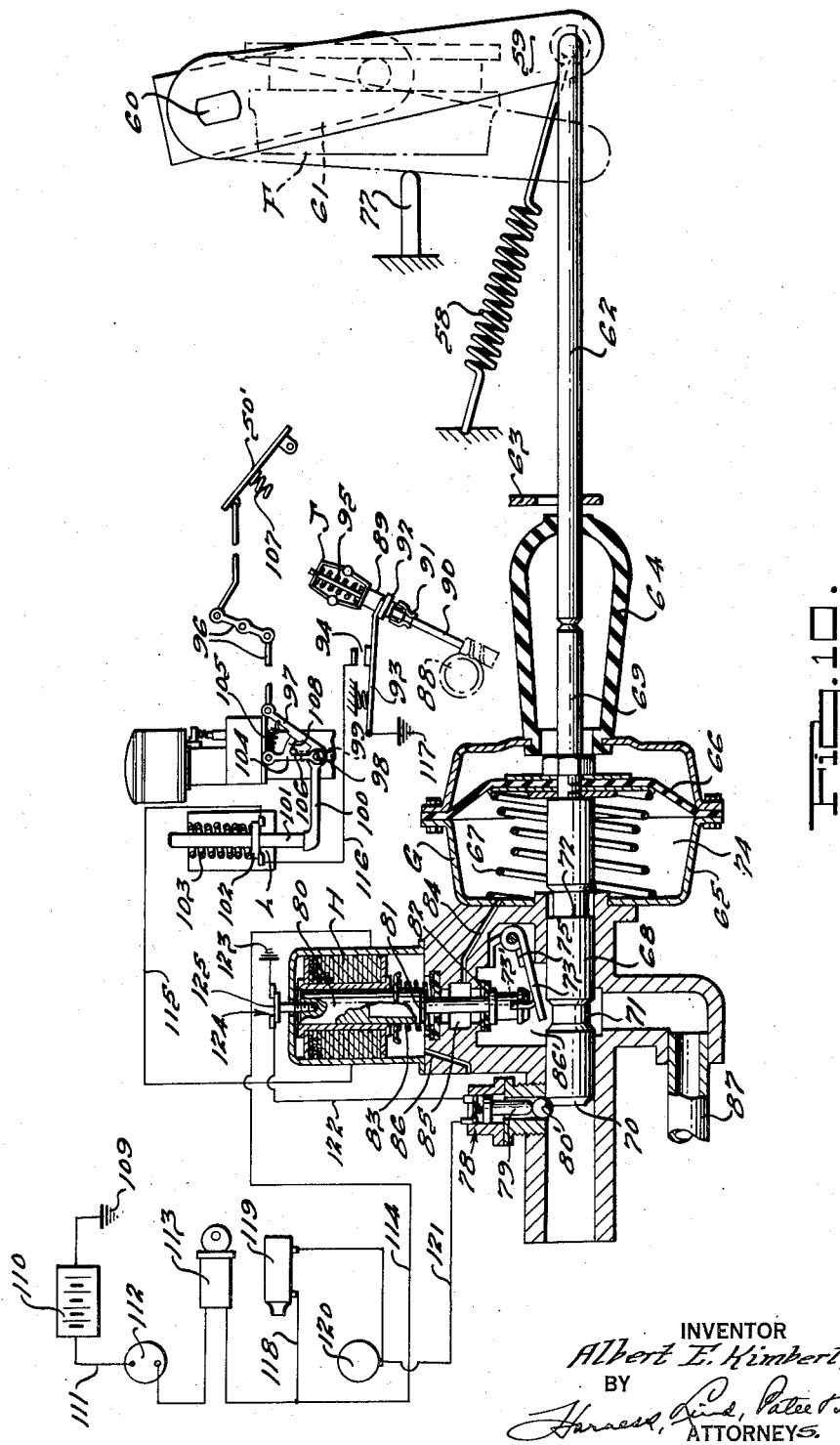
INVENTOR
*Albert E. Kimberly, Jr.*
BY
*Harness, Dind, Patee & Harris*
ATTORNEYS.

Sept. 16, 1947. A. E. KIMBERLY, JR 2,427,408
POWER TRANSMISSION CONTROL MEANS
Filed Oct. 4, 1940 4 Sheets-Sheet 4

INVENTOR
Albert E. Kimberly, Jr.
BY
ATTORNEYS

Patented Sept. 16, 1947

2,427,408

UNITED STATES PATENT OFFICE 2,427,408

POWER TRANSMISSION CONTROL MEANS

Albert E. Kimberly, Jr., Detroit, Mich., assignor to Chrysler Corporation, Highland Park, Mich., a corporation of Delaware Application October 4, 1940, Serial No. 359,674

8 Claims. (Cl. 74—472)

1

This invention relates to motor vehicles and refers more particularly to power transmission and control mechanism therefor.

In certain types of automatic and semi-automatic transmissions such as shown and described in the copending application of Carl A. Neracher et al., Serial No. 335,310, filed May 15, 1940, by way of example, it is possible to so manipulate the vehicle that the transmission becomes locked up in a shift position; also to render the ignition system inoperative at an undesired time. While the aforesaid difficulties would not ordinarily occur, it happens that once in a while a driver of a vehicle equipped with this type of transmission system does experience these difficulties and while said application discloses means to release a locked-up transmission and to restore the ignition system it is nevertheless desirable to insure against the occurrence of the undesirable difficulties in the first place.

In the application of William T. Dunn, Serial No. 354,512, filed August 28, 1940, and which has eventuated in Patent No. 2,257,674, dated September 30, 1941, there is disclosed an arrangement seeking to overcome the undesirable difficulties but under certain conditions which are unusual but nevertheless likely to occur, the difficulties may still arise.

It is an object of my invention to provide means for overcoming the aforesaid difficulties, my invention operating automatically without attention on the part of the driver.

Another object of my invention is to provide means insuring against undesired grounding of the engine ignition in connection with transmission systems employing ignition grounding means for momentary relief of torque between positively engaging drive control elements whereby such elements may be readily relatively separated to release a drive in the transmission. Such systems are especially desirable, by way of example, where change in speed ratio drive is to be made while the engine is delivering power by releasing the positive drive control elements which may be the elements of a positive clutch.

A further object of my invention is to provide means for preventing a transmission from getting into an undesired locked-up or no-back condition in which the driver cannot manipulate the transmission. Such condition frequently arises in connection with transmissions employing an overrunning clutch in the line of drive and especially when the car tends to roll backwards down hill and the shift lever is set for forward drive.

2

Another object of my invention is to provide control means for modifying the action of transmission control systems under conditions where the driver brings the car to a stop with the engine ignition system turned off prematurely. Under such conditions, especially for transmission systems embodying governor control of electrical solenoids or other devices, the drive control elements do not properly respond to the main transmission control and either the speed ratio change does not take place as desired or the transmission becomes locked-up or the ignition grounded or several or all of these undesired conditions are brought into action at the same time. My invention insures against the occurrence of these undesired conditions.

Further objects and advantages of my invention will be more apparent from the following illustrative embodiment thereof, reference being had to the accompanying drawings in which:

Fig. 1 is a side elevational view showing a motor vehicle engine and power transmission equipped with my invention.

Fig. 2 is a longitudinal sectional elevational view through the main clutching mechanism.

Fig. 3 is a similar view through the change speed transmission.

Fig. 4 is a detail enlarged view of the blocker clutch as seen in Fig. 3.

Fig. 5 is a sectional plan view illustrated as a development according to line 5—5 of Fig. 4, the automatic clutching sleeve being released.

Fig. 6 is a similar view showing the automatic clutching sleeve in its intermediate shift position during the drive blocking condition.

Fig. 7 is a similar view showing the automatic clutching sleeve in its coasting relationship from the Fig. 6 showing, the clutching sleeve being unblocked during coast for its clutching movement.

Fig. 8 is a similar view showing the automatic clutching sleeve in full clutching engagement.

Fig. 9 is a view similar to Fig. 5 but showing the automatic clutching sleeve in its other intermediate shift position during the coast blocking condition.

Fig. 10 is a diagrammatic view of the control mechanism for the automatic clutching sleeve, the latter being shown in its released position.

Figures 11, 12:
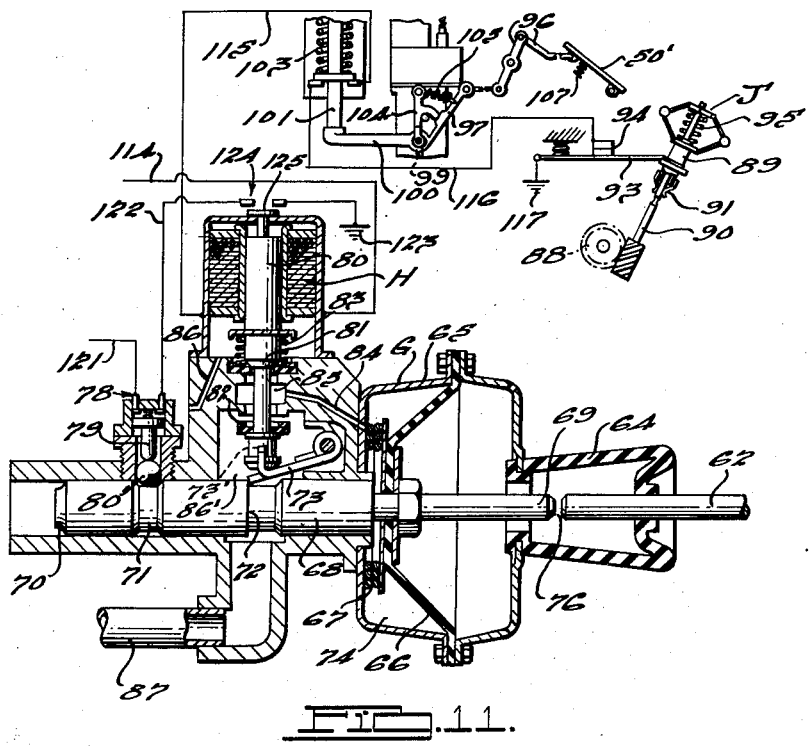
Fig. 11 is a similar view of a portion of the Fig. 10 control mechanism in another operating position.
Fig. 12 is a view similar to Fig. 11 but illustrating a modified arrangement for ignition interruption.

While my control may be employed in conjunction with various types and arrangements of motor vehicle transmissions, in order to illustrate one driving system I have shown my invention in connection with certain salient parts of the aforesaid Neracher et al. application.

In the drawings A represents the internal combustion engine which drives through fluid coupling B and conventional type of friction main clutch C to the speed ratio transmission D whence the drive passes from output shaft 20 to drive the rear vehicle wheels in the usual manner.

The engine crankshaft 21 carries the vaned fluid coupling impeller 22 which in the well known manner drives the vaned runner 23 whence the drive passes through hub 24 to clutch driving member 25. This member then transmits the drive, when clutch C is engaged as in Fig. 2, through driven member 26 to the transmission driving shaft 27 carrying the main drive pinion 28. A clutch pedal 29 controls clutch C such that when the driver depresses this pedal, collar 30 is thrust forward to cause levers 31 to release the clutch driving pressure plate 32 against springs 33 thereby releasing the drive between runner 23 and shaft 27. The primary function of the main clutch C is to enable the driver to make manual shifts in transmission D.

Referring to the transmission, pinion 28 is in constant mesh with gear 34 which drives countershaft 35 through an overrunning clutch E of the usual type such that when shaft 27 drives in its usual clockwise direction (looking from front to rear) then clutch E will engage to lock gear 34 to countershaft 35 whenever the gear 34 tends to drive faster than the countershaft. However, whenever this gear 34 tends to rotate slower than the countershaft then clutch E will automatically release whereby shaft 27, under certain conditions, may readily drop its speed while countershaft 35 continues to revolve.

Countershaft 35 comprises cluster gears 36, 37 and 38 which respectively provide drives in first, third and reverse. Freely rotatable on shaft 20 are the first and third driven gears 39 and 40 respectively in constant mesh with countershaft gears 36 and 37. A hub 41 is splined on shaft 20 and carries therewith a manually shiftable sleeve 42 adapted to shift from the Fig. 3 neutral position either rearwardly to clutch with teeth 43 of gear 39 or else forwardly to clutch with teeth 44 of gear 40. Sleeve 42 is operably connected to shift rail 45 adapted for operation by any suitable means under shifting control of the vehicle driver.

Shaft 20 also carries reverse drive gear 46 fixed thereto. A reverse idler gear 47 is suitably mounted so that when reverse drive is desired, idler 47 is shifted into mesh with gears 38 and 46.

First, third and reverse speed ratio drives and neutral are under manual shift control of the vehicle driver, the main clutch C being released by depressing pedal 29 in shifting into any one of these drives.

First is obtained by shifting sleeve 42 to clutch with teeth 43, the drive passing from engine A, through fluid coupling B, clutch C and shaft 27 to pinion 28 thence through gear 34 and clutch E to countershaft 35. From the countershaft the drive is through gears 36, 39 and sleeve 42 to shaft 20.

Third is obtained by shifting sleeve 42 to clutch with teeth 44, the drive passing from the engine to the countershaft 35 as before, thence through gears 37, 40 and sleeve 42 to shaft 20.

Reverse is obtained by shifting idler into mesh with gears 38, 46, sleeve 42 being in neutral, the reverse drive passing from the engine to the countershaft 35 as before, thence through gears 38, 47 and 46 to shaft 20.

Slidably splined on teeth 48 carried by gear 40 is the automatic clutching sleeve F which, under certain conditions, is adapted to shift forwardly to clutch with teeth 49 carried by pinion 28 thereby positively clutching shaft 27 directly to gear 40. This sleeve F is adapted to step-up the speed ratio drive from first to second and from third to fourth which is a direct drive speed ratio. Control means is provided which limits clutching of sleeve F to approximate synchronism with teeth 49 and also to a condition of engine coast, sleeve F being prevented from clutching during that condition known as engine drive as when the engine is being speeded up under power.

When driving in first, second is obtained by the driver releasing the usual accelerator pedal 50' thereby closing the engine throttle valve and allowing the engine to rapidly coast down. When this occurs, the engine along with shaft 27, pinion 28 and gear 34 all slow down while shaft 20 along with gears 39 and 36 continue their speeds by accommodation of clutch E which now overruns. The engine slows down until teeth 49 are brought to approximate synchronism with sleeve F which thereupon automatically shifts to clutch with teeth 49 resulting in a two-way drive for second as follows: pinion 28 through sleeve F to gear 40 thence through gears 37, 36 and 39 to sleeve 42 and shaft 20, the clutch E overrunning.

When driving in third, fourth or direct is obtained just as for second by driver release of the accelerator pedal and resulting shift of sleeve F to clutch with teeth 49 when these parts are synchronized by reason of the engine coasting down from the drive in third. The direct drive is a two-way drive as follows: pinion 28 through sleeve F to gear 40 thence directly through sleeve 42 to shaft 20, clutch E overrunning as before.

Referring to Figs. 4 to 9 there is shown the blocking means for controlling clutching shift of sleeve F so as to limit clutching thereof to engine coasting and synchronous relationship of the clutching parts. Sleeve F is provided with a series of pairs of what may be termed long and short teeth 50, 51 certain of which may be bridged or joined together. A blocker ring 52 is provided with blocking teeth 53 which either lie in the path of forward shift of teeth 50 or 51 or else between these teeth to allow clutching shift of sleeve F. Thus, blocker 52 has, at suitable locations, a drive lug 54 engaged in a slot 55 of gear 40. The blocker is urged under light energizing pressure of spring 56 into constant frictional engagement at 57 with pinion 28 so that the blocker tends to rotate with pinion 28 within the limits afforded by the travel of lug 54 circumferentially in slot 55.

During drive in first and third, the speed of shaft 27 exceeds the speed of pinion 28 so that, if sleeve F is fully released, the parts will be positioned as in Fig. 5 wherein the blocker leads the sleeve F thereby positioning blocker teeth 53 axially in alignment with the short teeth 51. If now the sleeve F is urged forwardly it will move to the Fig. 6 position of drive blocking and will remain in this blocked position as long as the engine drives the car in first or third.

If now the driver releases the accelerator pedal so that the engine may coast down under accommodation of overrunning clutch E, while sleeve F is urged forwardly, then when pinion 28 is reduced in speed to that of sleeve F slight further drop in speed of pinion 28 for a fraction of a revolution below the speed of sleeve F will cause blocker 52 to rotate slightly relative to sleeve F until blocker teeth 53 strike the adjacent sides of long teeth 50 as in Fig. 7 thereby limiting further reduction in speed of the blocker relative to sleeve F. At this time the sleeve F is free to complete its forward clutching shift with teeth 49, as in Fig. 8, the blocker teeth 53 passing between adjacent long and short teeth 50, 51. With the sleeve F thus clutched during engine coast, a two-way drive is established in second or fourth depending on whether the manually shiftable sleeve F was set for first or third just prior to the clutching shift of sleeve F.

In the event that sleeve F is urged forwardly from its Fig. 5 position at a time when the pinion 28 is rotating faster than pinion 28, then the blocker 52 will lag behind the sleeve and will be blocked by engagement of long teeth 50 with the blocker teeth 53 as shown in Fig. 9. This is referred to as the coast blocking condition. If now the engine is speeded up by the driver depressing the accelerator pedal in the usual manner, then the engine and blocker 52 rotate forwardly and blocker teeth 53 move over to the Fig. 6 drive blocking position thereby jumping the gap between teeth 50 and 51. This is the primary reason for providing the long and short teeth whereby sleeve F clutches only from the drive blocking condition followed by engine coast which protects the teeth and avoids harsh clutching effects on the passengers and transmission mechanism. On accelerating the engine from the Fig. 9 coast blocking condition, the engine comes up to a speed limited by engagement of the overrunning clutch E for drive in either first or third depending on the setting of the manually shiftable sleeve 42. Then on releasing the accelerator pedal the sleeve F will synchronously clutch with teeth 49 during coast to step-up the drive to either the second or fourth as aforesaid.

The transmission is provided with suitable actuator means for controlling shift of sleeve F along with several novel control means. Referring particularly to Figs. 10 and 11, there is illustrated a pressure fluid operated motor G utilizing air pressure for its operation. For convenience this motor is arranged to operate by the "vacuum" in the intake manifold system of the engine under control of electromagnetic means illustrated in the form of a solenoid H.

Forward shift of sleeve F is effected, under control of motor G, by reason of a spring 58 fixed at one end and exerting a pull on lever 59 which is connected to sleeve F through the cross-shaft 60 and shifter yoke 61. Pivoted to the lower end of lever 59 is a follower rod 62 guided in a support 63 and in the rubber sealing boot 64 carried by cylinder 65 which contains the diaphragm member 66 urged in a direction to release sleeve F by a spring 67 which is much stronger than spring 58. Diaphragm member 66 is connected to a leader rod 68 which has a rear extension 69 aligned with rod 62.

Rod 68 has a series of detents 70, 71 and 72, the latter cooperating with suitable holding means herein illustrated in the form of a latch 73 such that when vacuum is admitted to chamber 74 to cause the member 66 and rod 68 to assume their Fig. 11 positions, latch 73 under action of rat-trap spring 75 catches on the forward shoulder of detent 72 and holds the parts as in Fig. 11. At this time rod portion 69 moves further than rod 62 by the amount of gap 76, a stop 77 acting on lever 59 limiting forward movement of sleeve F by spring 58.

In order to provide for release of sleeve F, it is desirable to provide some means for momentarily relieving the torque load at the teeth 49 and sleeve F and in the present instance I have provided such means as a system of grounding the primary terminal of the usual distributor of the ignition system whereby the engine ignition may be momentarily rendered ineffective thereby unloading the torque at sleeve F sufficiently to insure its release by spring 67. This ignition interrupting system is under control of an interrupter switch 78 which is closed by plunger 79 and ball 80' whenever rod 69 moves between the Fig. 11 and Fig. 10 positions by reason of the enlarged rod portion between detents 70, 71. Detent 71 is so arranged that, with the parts as in Fig. 11 and sleeve F clutched, rod 68 may move rearwardly sufficiently to close gap 76 at the lost-motion between rod portion 69 and rod 62, this movement causing switch 78 to close and ground the ignition system whereupon spring 67 may then cause further movement of rod 68 and rod 62 to release sleeve F, the switch 78 then opening by detent 70 to restore the ignition system. When rod 68 moves from its Fig. 10 position to its Fig. 11 position, thereby permitting spring 58 to clutch sleeve F synchronously, the ignition system is not interrupted even though interrupter switch 78 is closed during this movement of rod 68. The means for accomplishing this desirable function will be presently described.

The vacuum supply to chamber 74 is under control of solenoid H which comprises an armature plunger 80 having valving parts 81, 82. In Fig. 10 the solenoid H is de-energized, a spring 83 acting to raise plunger 80 to seat valve 82 and shut off the vacuum supply to chamber 74 and at the same time unseat valve 81 so as to vent this chamber through passage 84, chamber 85 and vent passage 86. When the solenoid is energized then plunger 80 is lowered against the raising action of spring 83 thereby seating valve 81 to shut off vent 86 and open valve 82 as in Fig. 11 thereby opening chamber 74 to the engine intake manifold K through passage 84, chamber 86', and pipe 87.

A certain lost motion is provided between plunger 80 and the inwardly bent finger 73' of latch 73 so that when the plunger moves downwardly the latch may subsequently catch at detent 72 when vacuum operates member 66, the parts then remaining in the Fig. 11 position independently of vacuum in chamber 74 until solenoid H is de-energized thereby causing spring 83 to raise plunger 80 against finger 73' to release the latch and vent chamber 74.

It is deemed preferable to provide a speed control on the energization of solenoid H so as to insure automatic release of sleeve F below a predetermined car speed and automatic engagement of sleeve F above a predetermined car speed. Whenever the car is in forward driving condition the manual sleeve 42 is either shifted rearwardly to the low range or forwardly to the high range so that by driving a governor from the countershaft 35 it is possible to provide a speed control operated proportionate to the speed of travel of the car. Driven from countershaft gear 88 is a governor J of any suitable type, this governor operating a sleeve 89 outwardly along its drive shaft 90 as the car speed reaches a predetermined point, the break-away being under control of a detent 91 if desired.

The sleeve 89 has a shoulder 92 engaged by the swinging switch piece 93 of the governor switch 94. When the car is stationary the detent 91 is engaged and switch 94 is open. As the car accelerates the governor eventually reaches its critical speed and detent 91 releases thereby causing switch 94 to close. As the car slows down, the governor spring 95 restores the parts to the Fig. 10 position and by proportioning the various parts it is obvious that switch 94 may be made to function at desired speeds proportionate to car travel. As an example of one arrangement of governor operation and gearing arrangement, the governor may be made to close switch 94 during car acceleration in first and third respectively at approximately 7 and 15 M. P. H. (miles per hour), the switch 94 opening on stopping the car in direct and second at approximately 7 and 3 M. P. H. respectively.

In order to prevent undesired lowering of plunger 80 with attendant latching of member 66 and clutching of sleeve F when the car is stopped as would occur, as set forth in said Neracher et al. application, in the event the driver brings the car to a stop, especially on an upgrade, while prematurely shutting off the engine ignition and leaving the sleeve 42 shifted in one of its forward drive positions, I have provided an improved control system to maintain the member 66 against such undesired latching. My system provides for simplifying the control arrangement in said Neracher et al. and in said Dunn applications particularly by eliminating certain of the controls set forth in said applications and by preventing the undesired difficulties from arising under any circumstances.

In carrying out my invention I have provided a control for solenoid H such that whenever the solenoid is deenergized, the spring 83 will function to vent chamber 74. By arranging the governor switch 94 to open as the car approaches a stop, disengagement of clutch sleeve F from teeth 49 is assured. Likewise shutting off the ignition at the ignition switch will likewise automatically cause release of sleeve F independently of the presence of vacuum in manifold K and chamber 86'. By reason of my control system, the car cannot even under unusual circumstances, as set forth in said copending applications and in the further copending application of Teno Iavelli, Serial No. 354,537, filed August 28, 1940, and which has eventuated in Patent No. 2,267,464, dated December 23, 1941, be brought to rest with the parts in the Fig. 11 position and consequently there is no danger of gap 76 being taken up at this time to undesirably ground out the ignition system with the transmission locked against release of sleeve F in an inherent no-back condition.

In Fig. 10 there is provided means under control of the driver while driving in second or fourth for effecting step-down change in the transmission to first or third, as the case may be, this control means being referred to as a kick-down control as it is brought into action by depressing the usual accelerator pedal to the limit of its throttle-opening direction of movement. At this time sleeve F is, of course, under load by reason of its engagement with teeth 49 driven by the engine, and the momentary interruption of the engine ignition is effected at this time to unload sleeve F and permit spring 67 to release the sleeve to the Fig. 10 position.

The kick-down control is illustrated as taking place by moving the accelerator pedal beyond its wide-open throttle position of Fig. 10, so that as the accelerator pedal overtravels the wide-open throttle the step-down change in the transmission will be accomplished by releasing sleeve F.

The accelerator pedal 50' operates a suitable linkage 96 connected to the bell-crank lever arm 97 loosely mounted on the shaft 98 to which is fixed the throttle valve 99. The bell-crank lever has a second arm 100 which engages switch-operator 101 at this time. This operator is carried by conductor 102 of the kick-down switch L, a spring 103 acting to yieldingly maintain switch L closed. Fixed to shaft 98 is an arm 104 which follows throttle-opening movement of lever arm 97 by reason of tension spring connection 105 until arm 104 engages a stop 106 at wide-open throttle. Further depression of pedal 50' beyond the Fig. 10 position, causes lever arm 100 to open switch L, spring 105 yielding to allow arm 97 to swing away from arm 104 which remains in its wide-open throttle position. When pedal 50' is released, accelerator pedal spring 107 operates through linkage 96 to swing the lever unit 97, 100 counterclockwise as viewed in Fig. 10 causing the switch L to close by spring 103, at approximately wide-open throttle, and then as pedal 50' moves through its throttle-valve operating range lever arm 97 acts on finger portion 108 of arm 104 to move the throttle-valve to its closed position.

The governor switch 94 and the kick-down switch L are in series for controlling energization of solenoid H as follows. From ground 109 the solenoid controlling circuit extends through the usual storage battery 110 thence by conductor 111 to ammeter 112 and engine ignition switch 113. From this switch a conductor 114 goes to the coil winding of solenoid H and thence by conductor 115 to switch L and then by conductor 116 to switch 94 and ground 117.

The engine ignition circuit is taken from conductor 114 by a branch conductor 118 extending to coil 119 and distributor 120.

The ignition grounding circuit for momentarily interrupting the ignition system comprises a conductor 121 extending from the primary terminal of distributer 120 to the interrupter switch 78 from whence the conductor 122 extends to a suitable ground. In Fig. 10 this ground is taken at 123 through a switch 124 which is in series with switch 78. The switch 124 is controlled by a conductor 125 which is carried by armature plunger 80 such that when the solenoid H is de-energized as in Fig. 10 the plunger 80 under action of spring 83 causes conductor 125 to close switch 124. When the solenoid H is energized to lower plunger 80 as in Fig. 11, then conductor 125 moves with the plunger to open switch 124. By reason of this arrangement the switch 78, when closed, will interrupt the ignition system only when switch 124 is closed and not during the time that solenoid H is energized to cause vacuum to act on member 66 to move rod 68 from its Fig. 10 position to its Fig. 11 position. This latter movement directs clutching of sleeve F and grounding the ignition at such time would be undesirable.

In the operation of the mechanism, the car at standstill and with the ignition switch 113 closed and the engine idling will cause the solenoid H to be de-energized as in Fig. 10 because governor switch 94 is open thereby breaking the solenoid circuit. Cylinder 74 is vented and sleeve F disengaged. The driver shifts sleeve 42 to either the high or low range and accelerates the car ordinarily above the critical speed of governor J thereby causing switch 94 to close. As vacuum builds up in the engine intake manifold K, plunger 80 now lowered against spring 83 because switch 94 is closed, piston 66 will be operated by vacuum thereby moving rod 68 to its Fig. 11 latched position without interrupting the engine ignition system because switch 124 is open when switch 78 momentarily closes. As soon as the driver allows the engine to coast, sleeve F will engage teeth 49 synchronously, to step-up the driver to either second or fourth although the step-up will be delayed until engine coast thereby enabling drive in the slower driving ratio of first or third as long as desired.

If the car is initially accelerated in first above the governor critical speed and the engine allowed to coast, then second will automatically become operative. Then if the driver shifts sleeve 42 forwardly to the high range, third will of course be skipped and fourth will be obtained because sleeve F will remain engaged. Ordinarily, especially where the car is equipped with a fluid coupling B, the sleeve 42 may be left in its high range and all starts and stops made without further shifting. This is possible owing to slippage in the fluid coupling when stopping the car for a traffic light and is practicable because the fluid coupling allows high engine torque for favorable car acceleration and because governor J directs a downshift on bringing the car to rest. Thus there is automatically provided a favorable torque-multiplying gearing for starting, as in third.

Whenever the car is driving in fourth or second above the governor critical speed so that the governor switch 94 is closed, a full depression of the accelerator pedal will cause the transmission to step-down to third or first, the transmission step-up back to fourth or second taking place on release of the accelerator pedal with attendant synchronization of sleeve F with teeth 49.

When the accelerator pedal is fully depressed for the kick-down, above the governor critical speed when switch 94 is closed, switch L opens thereby de-energizing the solenoid circuit and causing spring 83 to raise plunger 80 and release latch 73 thereby venting chamber 74. As plunger 80 is raised, the switch 124 is closed. At this time the sleeve F is under driving torque from the engine operating under wide-open throttle. However, when latch 73 is released, spring 67 operates rod 68 rearwardly sufficiently to close gap 76 thereby closing the interrupter switch 78 and grounding the engine ignition system, switch 124 having been previously closed. This relieves the torque at sleeve F and spring 67 operates to release the sleeve whereupon the ignition is restored at detent 70 and the engine quickly speeds up to engage overrunning clutch E for establishing the third or first driving ratio depending on the setting of sleeve 42 prior to the kick-down operation.

On bringing the car to a stop when sleeve F is clutched as in fourth for example, the governor J in opening switch 94 insures breaking the solenoid circuit and venting chamber 74 for release of sleeve F as the torque at the teeth of sleeve F reduces to the point where spring 67 will release the sleeve. Where the governor switch 94 opens at a car speed slightly below engine idling speed, the momentary ignition interruption facilitates the sleeve release although this has been found unnecessary in most instances. In the event that the engine ignition is turned off at switch 113 prior to bringing the car to rest, the act of turning off the ignition switch will break the solenoid circuit and vent chamber 74 to insure release of sleeve F on stopping the car.

With my arrangement, even though the ignition switch 113 is opened prematurely in bringing the car to rest when in fourth for example, the pumping action incident to the car driving the engine so as to maintain vacuum in manifold K will not cause member 66 to be operated by vacuum to allow sleeve F to clutch as the car is stopped, because the solenoid H will be de-energized by interruption of the solenoid circuit and chamber 74 vented.

In the Fig. 12 modification I have illustrated an interrupter switch 78' which has the combined function of grounding the aforesaid conductor 121 and limiting this grounding to movement of rod 68 in taking up gap 76 without requiring a second switch as at 124 in Fig. 10. Otherwise the Fig. 12 system may be substituted in the Fig. 10 system as the resulting control on the transmission is the same.

In Fig. 12 the switch 78' comprises a fixed terminal 128 and a terminal 129 carried by swinging lever 130 pivotally supported at 131. A spring 132 yieldingly holds lever 130 in the Fig. 12 position of opening switch 78'. Terminal 129 is connected by conductor 133 to ground 134. When the sleeve F is clutched and vacuum is in chamber 74, then rod 68 is in the dotted position 68' and the inner end of lever 130 is engaged in detent recess 71'. If now the solenoid H is de-energized to vent chamber 74 and allow spring 67 to move rod 68 to take up gap 76, then the lever 130 is swung to engage terminal 129 with terminal 128 thereby closing switch 78' and grounding the ignition switch through 121, 78', 133 and 134. Then, as before, rod 68 moves additionally by spring 67 to release sleeve F and switch 78' opens to restore the ignition system to normal operation. In Fig. 12 the rod 68 is shortened to eliminate detent 70 which, in Fig. 10, prevented ball 80 from falling away from plunger 79.

The Fig. 12 system operates just as described for Fig. 10 insofar as the overall functions on the transmission are concerned. When rod 68 returns to the position 68', as when the solenoid is energized to supply vacuum to chamber 74 and latch rod 68 in its forward position for accommodating clutching of sleeve F, lever 130 is swung in a clockwise direction opening switch 78' even further than the separated position of terminals 129, 128 in Fig. 12 and therefore the ignition system is not grounded during the sleeve engagement functioning of the vacuum motor G.

Inasmuch as the vehicle is driven most of the time at a speed causing governor switch 94 to close and energize the solenoid H, such speed operates the usual vehicle generator, driven by the engine, at an efficient speed so that there is no drain on the battery. This is an advantage over systems wherein the solenoid is energized at low speeds rather than at high speeds, viz., with reference to the solenoid operations below and above the critical speed of the governor.

I claim:

1. In a motor vehicle power transmission having an engine; a driving structure adapted to receive drive from the engine; a driven structure adapted to receive drive from the driving structure for driving the vehicle; means operable to establish a speed ratio drive relationship between the driving and driven structures and including positively engageable drive control elements one of which is movable relative to the other to establish and release said speed ratio drive; a thrust member having a movement in a thrust-transmitting direction for effecting said drive-releasing movement of said movable element and a movement in a return direction for controlling said drive-establishing movement of said movable element; pressure fluid operating means for moving said thrust member in its said return direction; lost motion connecting means between said thrust member and said movable element such that said thrust member moves in its said return direction in advance of said drive-establishing movement of said movable element; a spring biasing said movable element for its said drive-establishing movement; electromagnetically controlled means adapted when electrically energized to releasably hold said thrust member in its position of return movement; a second spring biasing said thrust member in its said thrust-transmitting direction of movement; valving means operable to control venting of and pressure fluid operation of said pressure fluid operating means; and speed responsive means operating as an incident to bringing the vehicle to rest for automatically effecting de-energization of said electromagnet and venting operation of said valving means thereby to effect release of said holding means and bias of said thrust member as aforesaid by said second spring.

2. In a motor vehicle power transmission according to claim 1; said engine having an ignition system adapted to be momentarily disabled to facilitate said drive-releasing movement of said movable element; and disabling means for said ignition system comprising an ignition interrupter switch having an operating control therefor disposed in the path of movement of said thrust member such that this switch is momentarily closed in response to movement of said thrust member in its said thrust-transmitting direction.

3. In a motor vehicle power transmission according to claim 1; said engine having an ignition system adapted to be momentarily disabled to facilitate said drive-releasing movement of said movable element; and electrical circuit means for disabling said ignition system, including, an interrupter switch having an operating control therefor disposed in the path of movement of said thrust member such that this switch is momentarily closed in response to movement of said thrust member in its said thrust-transmitting direction, and a second switch in series with the said interrupter switch and adapted to be opened and closed in response to energization and de-energization respectively of said electromagnet.

4. In a motor vehicle power transmission according to claim 1; said engine having an ignition system adapted to be momentarily disabled to facilitate said drive-releasing movement of said movable element; and disabling means for said ignition system comprising an ignition interrupter switch having an operating control therefor so disposed in relation to said thrust member that said switch is momentarily closed in response to movement of said thrust member in its said thrust-transmitting direction while remaining open during movement of said thrust member in its said return direction.

5. In a motor vehicle power transmission having an engine; a driving structure adapted to receive drive from the engine; a driven structure adapted to receive drive from the driving structure for driving the vehicle; means operable to establish a speed ratio drive relationship between the driving and driven structures and including positively engageable drive control elements one of which is movable relative to the other to establish and release said speed ratio drive; a thrust member having a movement in a thrust-transmitting direction for effecting said drive-releasing movement of said movable element and a movement in a return direction for controlling said drive-establishing movement of said movable element; differential pressure operating means for moving said thrust member in its said return direction; lost motion connecting means between said thrust member and said movable element such that said thrust member moves in its said return direction in advance of said drive-establishing movement of said movable element; a spring biasing said movable element for its said drive-establishing movement; electromagnetically controlled means adapted when electrically energized to releasably hold said thrust member in its position of return movement; a second spring biasing said thrust member in its said thrust-transmitting direction of movement; valving means operable to control venting of and differential pressure operation of said differential pressure operating means; speed responsive means operating as an incident to bringing the vehicle to rest for automatically effecting de-energization of said electromagnet and venting operation of said valving means thereby causing said second spring to bias said thrust member in its said thrust-transmitting direction of movement; said engine having an ignition system adapted to be momentarily disabled to facilitate said drive-releasing movement of said movable element; a switch for controlling functioning of said ignition system; electrical circuit means, including said switch, for effecting said disabling of said ignition system; and operating means for said switch including means providing an operating connection between said switch and said thrust member adapted to hold said switch closed during a portion of the movement of said thrust member in its said thrust-transmitting direction.

6. In a motor vehicle power transmission having an engine; a driving structure adapted to receive drive from the engine; a driven structure adapted to receive drive from the driving structure for driving the vehicle; means operable to establish a speed ratio drive relationship between the driving and driven structures and including positively engageable drive control elements one of which is movable relative to the other to establish and release said speed ratio drive; a thrust member having a movement in a thrust-transmitting direction for effecting said drive-releasing movement of said movable element and a movement in a return direction for controlling said drive-establishing movement of said movable element; differential pressure operating means for moving said thrust member in its said return direction; lost motion connecting means between said thrust member and said movable element such that said thrust member moves in its said return direction in advance of said drive-establishing movement of said movable element; a spring biasing said movable element for its said drive-establishing movement; electromagnetically controlled means adapted when electrically energized to releasably hold said thrust member in its position of return movement; a second spring biasing said thrust member in its said thrust-transmitting direction of movement; valving means operable to control venting of and differential pressure operation of said differential pressure operating means; electrical circuit means, including a speed responsive switch operating as an incident to bringing the vehicle to rest, for effecting de-energization of said electromagnet and venting operation of said valving means thereby causing said second spring to bias said thrust member in its said thrust-transmitting direction of movement; said engine having an ignition system adapted to be momentarily disabled to facilitate said drive-releasing movement of said movable element; a pair of ignition control switches; means for effecting operation of one of said ignition control switches as an incident to de-energization of said electromagnet; operating means for the other of said ignition control switches including means providing an operating connection between this switch and said thrust member such that this switch is held closed during a portion of the movement of said thrust member in its said thrust-transmitting direction; and electrical grounding means, including said ignition control switches arranged in series with each other, for effecting said disabling of said ignition system.

7. In a motor vehicle provided with an internal combustion engine having an intake system providing a vacuum source, an accelerator, an engine controlling ignition system, and a change-speed transmission, a motor for operating the transmission and in part controlling the operation of the ignition system to facilitate a certain operation of the transmission, said motor including a vacuum and spring operated power element operably connected to a torque transmitting element of the transmission, a control valve for controlling communication between said vacuum source and said power element, electromagnetically controlled means for releasably holding said power element in its position of vacuum operation independently of the continuance of vacuum at said power element, an ignition controlling switch, switch operating force transmitting means operable by said power element, and electrical means cooperating with said switch to provide a means for cutting the ignition system into or out of operation and for controlling the operation of said valve and said holding means, said electrical means including an accelerator operated switch and a governor operated switch, the parts of said motor being so constructed and arranged and so operative as to effect, after the accelerator is depressed sufficiently to operate said accelerator operated switch or after the governor operated switch is operated, de-energization of said electromagnet, operation of said valve to vent said power element, and spring operated movement of said power element in one direction to move said torque transmitting element to thereby uncouple said element from another torque transmitting element of the transmission and at the same time render the electrical means, including said ignition controlling switch, operable to cut the ignition system out of operation and thereby facilitate said uncoupling operation.

8. In a motor vehicle power transmission having an engine, said engine having an intake system providing a vacuum source; a driving structure adapted to receive drive from the engine; a driven structure adapted to receive drive from the driving structure for driving the vehicle; means operable to establish a speed ratio drive relationship between the driving and driven structures and including positively engageable drive control elements one of which is movable relative to the other to establish and release said speed ratio drive; a thrust member having a movement in a thrust-transmitting direction for effecting said drive-releasing movement of said movable element and a movement in a return direction for controlling said drive-establishing movement of said movable element; differential pressure operated means utilizing said vacuum source for moving said thrust member in its said return direction; lost motion connecting means between said thrust member and said movable element such that said thrust member moves in its said return direction in advance of said drive-establishing movement of said movable element; a spring biasing said movable element for its said drive-establishing movement; electro-magnetically controlled means adapted when electrically energized to releasably hold said thrust member in its position of return movement independently of said vacuum; a second spring biasing said thrust member in its said thrust-transmitting direction of movement; valving means operable to control venting of and vacuum operation of said differential pressure operated means; and speed responsive means operating as an incident to bringing the vehicle to rest for automatically effecting de-energization of said electromagnet and venting operation of said valving means thereby to effect release of said holding means and bias of said thrust member as aforesaid by said second spring.

ALBERT E. KIMBERLY, Jr.

REFERENCES CITED

The following references are of record in the file of this patent:

UNITED STATES PATENTS

| Number | Name | Date |
|---|---|---|
| 851,277 | Clark | Apr. 23, 1907 |
| 1,115,605 | Snohr | Nov. 3, 1914 |
| 1,683,175 | Falcke et al. | Sept. 4, 1928 |
| 1,847,688 | Couwenhoven | Mar. 1, 1932 |
| 2,080,067 | Stucatur | May 11, 1937 |
| 2,108,182 | Searle | Feb. 15, 1938 |
| 2,156,209 | Thurber | Apr. 25, 1939 |
| 2,177,428 | Fleischel | Oct. 24, 1939 |
| 2,214,099 | Claytor | Sept. 10, 1940 |
| 2,214,100 | Claytor | Sept. 10, 1940 |
| 2,236,657 | Webb | Apr. 1, 1941 |
| 2,243,111 | McFarland | May 27, 1941 |
| 2,257,838 | Claytor | Oct. 7, 1941 |
| 2,267,464 | Iavelli | Dec. 23, 1941 |
| 2,272,434 | Schjolin | Feb. 10, 1942 |